United States Patent [19]

Miller et al.

[11] Patent Number: 5,471,762
[45] Date of Patent: Dec. 5, 1995

[54] ADAPTOR FOR FITTING TO A DEVICE FOR MEASURING DEPRESSIONS, RISES AND WAVING CONDITIONS ON A SURFACE

[75] Inventors: Rickey L. Miller, 1040 Hickory La., Hillsdale, Mich. 49242; Russell A. Wriker, Huron, Ohio

[73] Assignee: Rickey L. Miller, Hillsdale, Mich.

[21] Appl. No.: 254,528

[22] Filed: Jun. 6, 1994

[51] Int. Cl.$^6$ .............................. G01B 5/20; G01B 5/28
[52] U.S. Cl. .................. 33/833; 33/836; 33/533
[58] Field of Search .................. 33/833, 836, 533, 33/832

[56] References Cited

U.S. PATENT DOCUMENTS

| | | | |
|---|---|---|---|
| 3,195,237 | 7/1965 | Aldeborgh | 33/836 |
| 3,352,018 | 11/1967 | Mazeika | 33/836 |
| 3,848,339 | 11/1974 | Strasbaugh | 33/832 |
| 5,205,046 | 4/1993 | Barnett et al. | 33/533 |
| 5,235,988 | 8/1993 | Johnson et al. | 33/836 |
| 5,339,534 | 8/1994 | Krayenhagen | 33/533 |

FOREIGN PATENT DOCUMENTS 266669   5/1950   Switzerland ............... 33/836

OTHER PUBLICATIONS

Copy of Specification Sheets from Mitutoyo SPC New Product Pamphlet re: IDS Digimatic Indicators, Series 543 (date unknown).

Primary Examiner—Christopher W. Fulton
Attorney, Agent, or Firm—Harness Dickey & Pierce

[57] ABSTRACT

An adaptor for attachment to a statistical process control depth measuring device for use in detecting surface defects. The adaptor includes an attachment end for attachment to the sensor end of the measuring device and a contact end for placement on the surface being examined. A hollow shaft defined along the long axis of the adaptor and centrally located allows for disposition of the sensor end and passage of the sensing probe. The sensing probe extends selectively beyond the contact end of the adaptor. Accessory stabilizing attachments for fitting to the contact end of the adaptor are optionally provided. The adaptor is constructed of either a metal or a polymerized material. In combination with the measuring device, the assembly allows for detection of depressions, surface rises, and waving conditions on many surfaces.

13 Claims, 1 Drawing Sheet

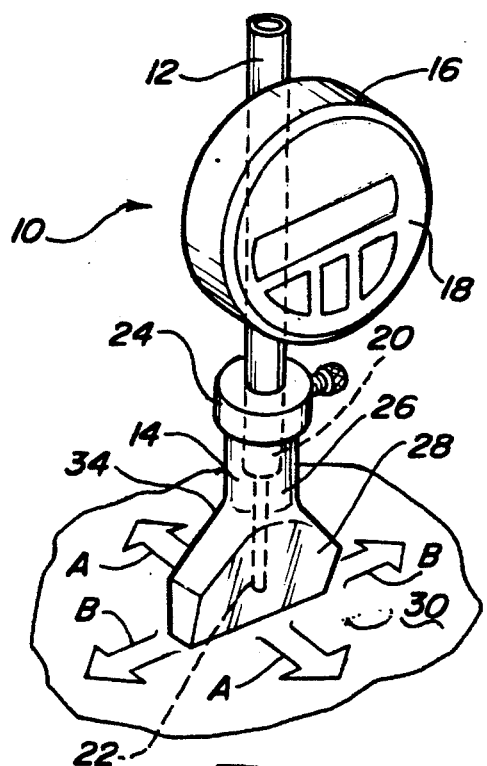
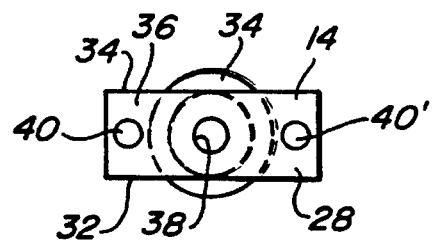
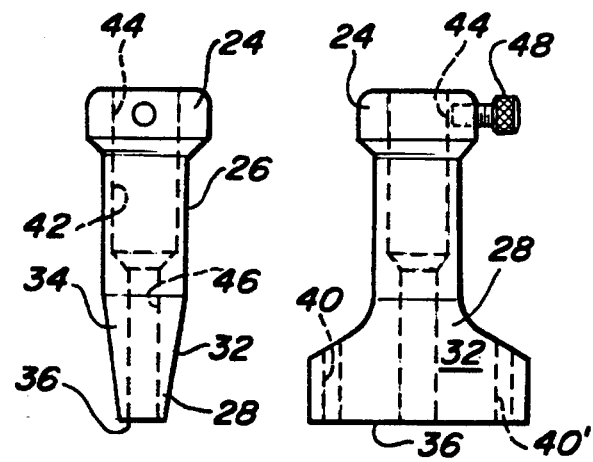
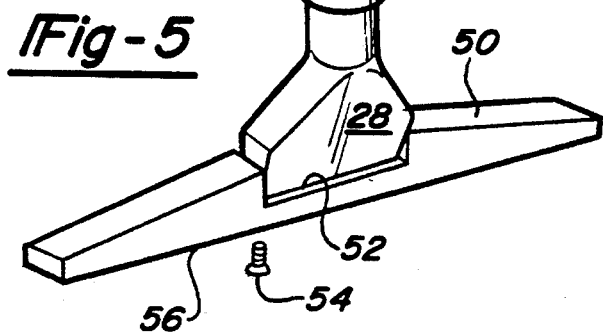
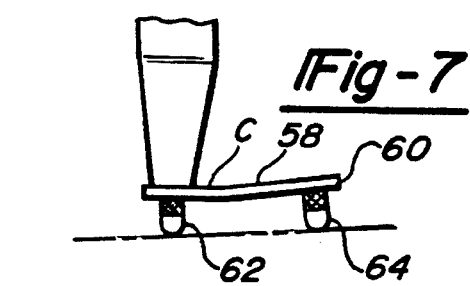
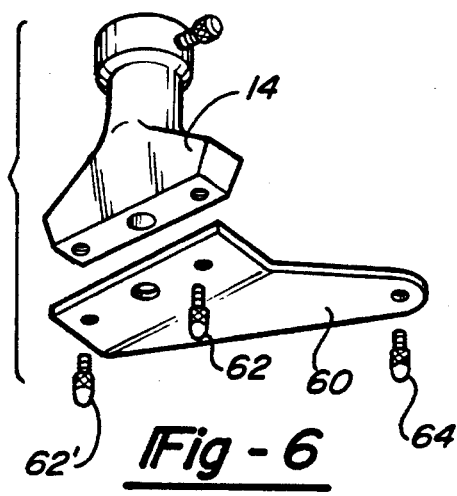

ADAPTOR FOR FITTING TO A DEVICE FOR MEASURING DEPRESSIONS, RISES AND WAVING CONDITIONS ON A SURFACE

BACKGROUND OF THE INVENTION

I. Field of the Invention

The present invention relates generally to measuring devices for measuring depressions, rises and waving conditions on a surface. More particularly, the present invention relates to an adaptor for use with such a measuring device to allow use of the measuring device directly on almost any surface.

II. Description of the Relevant Art

A common and long-standing problem associated with the manufacture of products having broad, smooth, flat or curved surface areas or for individual components having such characteristics is surface defects. The unaided eye is virtually useless in detecting, much less measuring, such defects. Surface defects typically comprise depressions, rises, or waving conditions. This problem is most commonly seen in the plastic injection molding industry, although the problem also exists to a lesser degree in metal stamping and extrusion.

Measurement of surface defects is possible to some extent according to current technology. The known method involves setting the product or the component to be measured in a locked position on a coordinate measurement machine and measuring the difference in surface planes. However, this process is not very time efficient when time for mounting, adjustment and examination is considered. The inefficiency of the present method is all the more striking in light of the 30 to 60 second cycle time of many press operations.

Accordingly, the known method for measuring surface defects has generally failed.

SUMMARY OF THE PRESENT INVENTION

The present invention overcomes the failings of the known method of measuring surface defects by providing an easy to use, hand-held assembly. The invention comprises an adaptor which is used in conjunction with a statistical process control depth measuring device.

The adaptor includes an attachment end, an intermediate body, and a contact end. The attachment end includes a centrally defined aperture for receiving the sensor end of the measuring device. A thumbscrew lock is preferably fitted to lock the adaptor to the sensor end of the measuring device.

The centrally defined aperture which begins at the attachment end is continually defined through the body and terminates at the contact end. This allows for passage of the sensing probe of the sensing device to extend beyond the contact end of the adaptor. In cross-section, the centrally defined aperture is reduced in diameter from a relatively wide, sensor end receiving aperture to a relatively narrow, probe-passing aperture.

The contact end of the adaptor is broader than either the attachment end or the intermediate body. This construction allows for improved stabilization of the indicator-adaptor assembly when passed over a surface. The sensor end includes end tips on true planes apart from center to permit the indicator-adaptor assembly to indicate the difference or variation within the plane being checked.

For improved stability, accessory stabilizers are provided for attachment to the contact end of the adaptor. Two embodiments are preferred. The first is an elongated stabilizer having an adaptor-receiving channel defined on its top side and a surface-contacting area defined on its bottom side. This embodiment of this stabilizer finds utility in the measuring of long, flat surfaces of glass, plastic or metal.

The second embodiment of the stabilizer comprises a more or less triangular base having three spaced apart tips. The top side attached to the adaptor and the bottom side contacts the surface to be measured. This embodiment of the stabilizer finds utility in measuring smaller surfaces where increased stability is necessary.

The present invention significantly eliminates the need to set the product or part up on a coordinate measurement machine prior to measuring. Rather, the product or part may be directly measured without setting up. This saves the worker considerable time, and allows the quick and accurate addressing of problems or concerns with support data. The user of the indicator-adaptor assembly reduces scrap due to quick detection and reduces machine down time by eliminating expensive coordinate measurement machines.

The indicator-adaptor assembly of the present invention was developed to address production line problems quickly and to measure the success of process changes made to correct a defect. The assembly also puts a real measurement to the two most troublesome conditions in injection molding, namely, the sink and the rise caused by ejector pins. Both conditions lead to rejection of the product or part by the customer. Neither condition is easy to assess visually.

The indicator-adaptor assembly of the present invention finds utility in providing quick and easy checking of sinks and ejector pin-type rises. The assembly also has use in checking heights on hot stamping and raised lettering. Virtually any elevation differential condition can be tested, because the indicator is zeroed-out prior to measurement. Furthermore, the sensing end of the adaptor may be modified to accommodate all surface variations from flat to curved. In addition, the sensing end may be textured with any degree of graining.

BRIEF DESCRIPTION OF THE DRAWINGS

The present invention will become more fully understood by reference to the following detailed description of the preferred embodiments of the present invention when read in conjunction with the accompanying drawings, in which like reference characters refer to like parts throughout the views, and in which:

FIG. 1 is a perspective view of the indicator-adaptor assembly of the present invention;

FIG. 2 is a bottom plan view of the adaptor of the present invention;

FIG. 3 is an end view of the adaptor;

FIG. 4 is a side view of the adaptor;

FIG. 5 is a preferred embodiment of the adaptor-stabilizer combination, shown in perspective;

FIG. 6 is an exploded view of an alternate embodiment of the adaptor-stabilizer combination of the present invention; and FIG. 7 is a side view of the adaptor-stabilizer combination embodiment shown in FIG. 6.

DETAILED DESCRIPTION OF THE PREFERRED EMBODIMENTS OF THE PRESENT INVENTION

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring first to FIG. 1, a perspective view of the indicator-adaptor assembly of the present invention is illustrated, generally indicated as 10. The assembly 10 includes a statistical process control depth measuring device 12 and an adaptor 14. The device 12 is available in a variety of designs and may have capacity for either analog or digital readout. Regardless of the overall design, the typical depth measuring device includes a body 16, a readout 18 on the body 16, a sensing end 20, and a sensing probe 22 extending from the sensing end 20.

The adaptor 14 represents the improvement of the present invention, and comprises an attachment end 24, an intermediate body 26, and a contact end 28. The contact end 28 includes a pair of opposed flat sides 32, 34 (unseen in this figure). As illustrated in FIG. 1, the contact end 28 may be maneuvered in any direction along a surface 30. By such manipulation, the assembly 10 may thus be used to detect surface defects. As illustrated, the contact end 28 is somewhat elongated, thus allowing the user particular control when the assembly 10 is moved along a direction generally indicated by arrows "A". Of course, measurements may also be taken in a perpendicular direction, or along a direction generally indicated by arrows "B".

To manipulate the assembly 10, the user simply holds the adaptor 14 along the flat sides 32, 34 and maneuvers the assembly 10 along the surface to be inspected.

FIG. 2 is a bottom plan view of the adaptor 14 and shows a contact surface 36 of the contact end 28. Centrally located on the contact surface 36 is defined a probe-passing aperture 38. It is through this aperture that the probe 22 of the device 12 passes to achieve contact with the surface to be measured. A pair of accessory-attachment holes 40, 40' are defined on the contact surface 36 to provide a method by which accessory stabilizers may be attached, as will be set forth below in the text related to FIGS. 5 through 7. This view more clearly illustrates the opposing relationship of the flat sides 32, 34.

FIG. 3 is an end view of the adaptor 14 and illustrates the slight cants of the flat sides 32, 34 somewhat converging in the direction of the contact surface 36. In addition, FIG. 3 illustrates in broken lines an outline of a through-aperture 42 which includes a centrally-defined, sensor end-receiving aperture 44 and a sensor-passing aperture 46. The sensor end-receiving aperture 44 and the sensor-passing aperture 46 are continuous.

FIG. 4 is a side view of the adaptor 14 of the present invention. This view aids in illustrating the preferred overall shape of the adaptor 14. Also more clearly seen are the accessory-attachment holes 40, 40'.

Although a variety of methods of fixing the adaptor 14 to the depth measuring device 12 are possible, the preferred method is illustrated in FIG. 4. This method includes a thumbscrew 48 that is provided at the attachment end 24 of the adaptor 14. The sensing end 20 of the depth measuring device 12 is inserted into the sensor end-receiving aperture 44 of the adaptor 14, and thereafter the thumbscrew 48 is turned to lock the sensing end 20 into the aperture 44.

To use the assembly 10, the user grasps the flat sides 32, 34 as noted above. The assembly is thereafter placed on and, if desired, drawn along the region to be examined. The indicated findings of the readout 18 are then observed and recorded.

There are times when the surface to be inspected demands stability that would possibly not be available working with the adaptor 14 alone. These situations arise where, for example, large, relatively flat expanses of metal, glass or a plastic are being inspected. Conversely, measurement of curved surfaces also places different stabilizing requirements on the assembly. In these situations, the contact surface 36 of the adaptor 14 as shown and described above may not be as effective in providing stability as might be otherwise desired. Accordingly, the present invention also includes a pair of accessory stabilizers that are intended for attachment to the contact end 28 of the adaptor 14.

The first of these is shown in FIG. 5 in which a perspective view of an elongated adaptor accessory 50 is illustrated. The accessory 50 includes an adaptor-receiving channel 52 defined along its top side. A fastener 54 is used to attach the accessory 50 to the adaptor 14 by attachment to the accessory-attachment holes 40, 40' as is conventionally known.

The elongated adaptor accessory 50 as illustrated includes an elongated surface contacting area 56. Because of its extended axial dimension, this adaptor-accessory combination provides the worker with considerably improved stability when inspecting large expanses of relatively flat surface area, such as might be found on sheet glass, automobile sheet metal, and the like. To operate the accessory-adaptor combination, the worker resets the depth sensing device 12 at zero to allow for the added depth of the accessory 50. Thereafter operation would follow the same steps as described above with respect to the assembly 10.

There are other situations in which the surface to be measured is far from flat and, in fact, may well be rounded or curved. In those situations, increased stability along both the X-and Y-axes of the adaptor would be preferred. The accessory of FIGS. 6 and 7 answers this need.

With reference to FIG. 6, an exploded view of a tripod-like accessory 58 is illustrated, shown in conjunction with the adaptor 14. The accessory 58 includes a mostly triangular base 60, a pair of back tips 62, 62', and a lone front tip 64. As may be understood, the back tips 62, 62' double as attachment fasteners for attachment into the accessory-attachment holes 40, 40'.

With reference to FIG. 7, a side view of the assembly of the tripod-like accessory 58 and the adaptor 14 is illustrated. This view makes clear that the base 58 has a slight bend along point "C". This bend, while not required, provides added stability to the overall assembly by positioning at their maximum distances from each other the contact points of the back tips 62, 62' and the front tip 64. The tips 62, 62', 64 may be rubber or plastic coated, or may themselves be composed of a polymerized material.

Having described our invention, however, many modifications thereto will become apparent to those skilled in the art to which it pertains without deviation from the spirit of the invention as defined by the scope of the appended claims.

We claim:

1. A sensor assembly for measuring depressions, rises and waving conditions on a selected surface, said assembly comprising:

a surface depression, rise and wave sensing device, said sensing device having a sensing end, said sensing end being substantially planar; and a stabilizing accessory for attachment to said sensing end of said device, said stabilizing accessory including a body, said body having an upper surface and a lower surface opposite said upper surface, said upper surface including a substantially planar region for mating with said substantially planar sensing end of said sensing device, said lower surface having a first end and a second end opposite said first end, said lower surface being substantially planar continuously between said first end and said second end.

2. The sensor assembly of claim 1, wherein said sensing device includes a depth measuring sensor and a sensor adaptor, said sensor adaptor including a sensor attachment end, said assembly further including means for removably attaching said stabilizing accessory to said sensor adaptor.

3. The sensor assembly of claim 2, wherein said sensor attachment end includes means for attaching said adaptor to said depth measuring sensor.

4. The sensor assembly of claim 2, wherein said sensing end of said sensing device is formed on said adaptor.

5. The sensor assembly of claim 4, wherein said depth measuring sensor includes a sensing probe.

6. The sensor assembly of claim 5, wherein said sensor adaptor includes a centrally-defined aperture for allowing passage of said probe.

7. The sensor assembly of claim 6, wherein said aperture is continuous from said sensor attachment end to said sensing end of said adaptor.

8. The sensor assembly of claim 1, wherein said sensing end has a length and a width, said length being greater than said width.

9. The sensor assembly of claim 1, further including means for attaching said stabilizing accessory to said adaptor.

10. The sensor assembly of claim 1, wherein said stabilizing accessory includes a length and a width, said length being greater than said width.

11. The sensor assembly of claim 1, wherein said stabilizing accessory is triangularly-shaped.

12. The sensor assembly of claim 11, wherein said stabilizing accessory includes a tip extending from said lower surface.

13. The sensor assembly of claim 2, wherein said adaptor includes a first side and a second side, said sides being disposed in non-parallel relation to one another.

* * * * *